US008064778B2

(12) United States Patent
Krasulick (10) Patent No.: US 8,064,778 B2
(45) Date of Patent: Nov. 22, 2011

(54) METHOD AND APPARATUS FOR CONTROLLING TUNABLE TRANSMITTER CHIRP

(75) Inventor: Stephen Krasulick, Albuquerque, NM (US)

(73) Assignee: Emcore Corporation, Albuquerque, NM (US)

( * ) Notice: Subject to any disclaimer, the term of this patent is extended or adjusted under 35 U.S.C. 154(b) by 856 days.

(21) Appl. No.: 12/077,609

(22) Filed: Mar. 20, 2008

(65) Prior Publication Data

US 2009/0022501 A1 Jan. 22, 2009

Related U.S. Application Data

(60) Provisional application No. 60/919,757, filed on Mar. 23, 2007.

(51) Int. Cl.
H04B 10/04 (2006.01)
(52) U.S. Cl. ........ 398/199; 398/198; 398/193; 398/182; 398/183
(58) Field of Classification Search .......... 398/182–188, 398/192–195, 199, 198, 159, 147
See application file for complete search history.

(56) References Cited

U.S. PATENT DOCUMENTS

| | | | | |
|---|---|---|---|---|
| 5,303,079 A * | 4/1994 | Gnauck et al. | ................. | 398/182 |
| 5,524,076 A * | 6/1996 | Rolland et al. | .................... | 385/8 |
| 5,778,113 A * | 7/1998 | Yu | ..................................... | 385/3 |
| 5,917,637 A * | 6/1999 | Ishikawa et al. | .............. | 398/197 |
| 5,991,471 A * | 11/1999 | Yu | ..................................... | 385/3 |
| 6,002,816 A | 12/1999 | Penninckx et al. | | |
| 6,741,761 B2 * | 5/2004 | Sharp | ................................ | 385/2 |
| 6,778,309 B2 * | 8/2004 | Freund et al. | ................. | 359/259 |
| 7,391,550 B2 * | 6/2008 | Harris et al. | ................... | 359/278 |
| 7,440,703 B2 * | 10/2008 | Shastri et al. | .................. | 398/183 |
| 7,466,922 B2 * | 12/2008 | Pierce et al. | .................. | 398/135 |
| 7,542,685 B2 * | 6/2009 | Bai et al. | ........................ | 398/193 |
| 7,633,988 B2 * | 12/2009 | Fish et al. | .................. | 372/50.22 |
| 7,657,190 B2 * | 2/2010 | Akiyama | ....................... | 398/195 |
| 7,742,705 B2 * | 6/2010 | Bai et al. | ........................ | 398/199 |
| 7,848,661 B2 * | 12/2010 | Iannelli | .......................... | 398/197 |
| 7,881,621 B2 * | 2/2011 | Iannelli | .......................... | 398/192 |
| 2001/0015843 A1 * | 8/2001 | Miyauchi et al. | ............. | 359/161 |
| 2002/0005970 A1 | 1/2002 | Lang | | |
| 2002/0005975 A1 * | 1/2002 | Nakamoto | ..................... | 359/254 |
| 2003/0012244 A1 * | 1/2003 | Krasulick et al. | ............... | 372/50 |
| 2003/0016430 A1 * | 1/2003 | Ransijn et al. | ................. | 359/245 |
| 2004/0196539 A1 * | 10/2004 | Chang et al. | ............. | 359/341.41 |
| 2005/0025500 A1 * | 2/2005 | Hallemeier et al. | ........... | 398/186 |
| 2006/0280505 A1 * | 12/2006 | Varshneya et al. | ............. | 398/140 |

OTHER PUBLICATIONS

S.K. Korotky, et al., High-Speed Low Power Optical Modulator With Adjustable Chirp Parameter, Integrated Photonics Research 1991, AT&T Bell Laboratories, Holmdel, NJ.
Y.A. Akulova, et al., 10Gb/s Mach-Zehnder Modulator Integrated With Widely-Tunable Sampled Grating DBR Laser, 2003 Optical Society of America.

* cited by examiner

Primary Examiner — Kenneth N Vanderpuye
Assistant Examiner — Hibret Woldekidan (57) ABSTRACT

A fiber-optic transmission system includes a transmitter having a designed chirp value. The transmitter has first and second inputs for receiving first and second input signals, respectively, used to produce a modulated output signal. An optical fiber is responsive to the transmitter for receiving the output signal. A circuit asymmetrically drives the first and second input signals so as to change the designed chirp value of the transmitter to another value. Methods of controlling the chirp of a commercially available transmitters are also disclosed. Because of the rules governing abstracts, this abstract should not be used to construe the claims.

16 Claims, 7 Drawing Sheets

METHOD AND APPARATUS FOR CONTROLLING TUNABLE TRANSMITTER CHIRP

CROSS-REFERENCE TO RELATED APPLICATIONS

The present application claims the benefit of copending U.S. Patent Application Ser. No. 60/919,757 filed Mar. 23, 2007, and entitled Modulator Drivers with Variable, Asymmetric Output Amplitudes, the entirety of which is hereby incorporated by reference for all purposes.

BACKGROUND

The present disclosure is directed generally to digital optical transmission systems, and more specifically to high-speed digital optical transmitters employing enhanced chirp control techniques to improve data transmission performance.

Optical transmission systems include optical transmission media, such as an optical fiber, for propagating information between an optical transmitter and an optical receiver. An optical transmitter for an optical fiber transmission system includes an optical source, such as a semiconductor laser, for generating a Continuous Wave (CW) light beam, and an optical modulator for modulating the CW light beam with the information to be transmitted. The optical receiver detects the transmitted optical signal and processes the optical signal into an electronic waveform that contains the transmitted information.

Chirp refers to the spread of the optical frequency of a signal. In optics, chirp may be caused due to the dispersion of the signal as it propagates through the optical fiber. Digital optical transmission systems are known that employ chirp control techniques to improve data transmission performance. For example, chirp may be introduced in the CW light beam to offset dispersion caused by the properties of the optical fibers.

Because the electrical data signal input to the modulator typically has a Non-Return-to-Zero (NRZ) data format, the optical signal generated by the data modulator typically has an NRZ modulation format. Modulators are also known to employ a Return-to-Zero (RZ) modulation format in digital optical transmission systems. Like the NRZ data transmission system, the conventional optical transmission system employing the RZ modulation format includes a laser for generating a CW light beam, and a data modulator for modulating the CW light beam in response to an electrical NRZ data signal. In addition, the conventional RZ data transmission system includes an RZ pulse modulator for carving RZ pulses from the modulated optical signal carrying the NRZ data.

Conventional NRZ or RZ optical transmission systems operating at bit rates of about 10 Gbits/s typically deploy either negative chirp (i.e., decreased optical frequency at leading edges of the modulated optical signal and increased optical frequency at trailing edges of the modulated signal) or no chirp (i.e., essentially no change in the optical frequency of the modulated optical signal) at the optical transmitter when transmitting data over optical fiber having positive dispersion characteristics. This is to achieve what is commonly known as the "maximum dispersion distance," which is the fiber distance beyond which neighboring data bits start to overlap and interfere. For example, the maximum dispersion distance for the conventional 10 Gbits/s optical transmitter is approximately 60 km of Standard Single-Mode Fiber (SSMF).

Another fiber distance that impacts optical transmission performance is the "effective non-linear fiber distance," which is the fiber distance over which the optical signal power is high enough to introduce impairment from fiber non-linearity. For example, the effective non-linear fiber distance for the conventional 10 Gbits/s optical transmitter is approximately 20 km of SSMF. In general, for optical transmitters operating at bit rates up to about 10 Gbits/s, the maximum dispersion distance is longer than the effective non-linear fiber distance. Because of the interplay between dispersion and fiber non-linearity in the transmission of optical data, conventional NRZ or RZ optical transmission systems operating at bit rates of about 10 Gbits/s typically employ both chirp control (e.g., negative chirp or no chirp) and dispersion mapping (e.g., placing dispersion compensating fiber at certain positions in the transmission link) techniques to optimize the overall data transmission performance.

For the foregoing reasons, it may be desirable to introduce chirp into a modulated CW light beam produced by commercially available components, such as a dual-drive Mach-Zehnder transmitter (Lithium Niobate or Indium Phosphide) that are designed for zero chirp, or to compensate for chirp introduced by the modulator.

SUMMARY

A fiber-optic transmission system includes a transmitter having a designed chirp value. The transmitter has first and second inputs for receiving first and second input signals, respectively, used to produce a modulated output signal. An optical fiber is responsive to the transmitter for receiving the output signal. A circuit asymmetrically drives the first and second input signals so as to change the designed chirp value of the transmitter to another value.

The present disclosure is also directed to a combination comprising a transmitter having a designed chirp value. The transmitter has first and second inputs for receiving first and second input signals, respectively, used to produce a modulated output signal. A circuit controls the amplitude of the first input signal and the amplitude of the second input signal such that the first and second amplitudes are asymmetrical so as to change the designed chirp value of the transmitter to another value.

The present disclosure is also directed to a method of controlling the chirp of a transmitter comprising asymmetrically driving first and second input signals input to the transmitter so as to change the chirp of the transmitter from a designed value to a desired value.

The present disclosure is also directed to a method of controlling the chirp of a transmitter comprising controlling the amplitude of a first input signal and the amplitude of a second input signal such that the first and second amplitudes are asymmetrical so as to change the designed chirp value of the transmitter to another value.

The disclosed apparatus and methods may be used to change a designed chirp value of a commercially available transmitter from a designed value of zero to a positive or a negative value, from a designed positive chirp value to zero or a negative value, or from a designed negative value to zero or a positive value. The present disclosure enables transmitters designed for a particular purpose (e.g., short-haul communications) to be used for other purposes (e.g., long-haul communications). The present disclosure enables an inexpensive, commercially available transmitter to be controlled in such a manner that the transmitter may be used in place of a more expensive transmitter. Those advantages and benefits, and others, will be apparent from the following description.

DESCRIPTION OF THE DRAWINGS

For the method and apparatus of the present disclosure to be easily understood and readily practiced, embodiments of the disclosed method and apparatus will be described, for purposes of illustration and not limitation, wherein.

DESCRIPTION

Figure 1A:
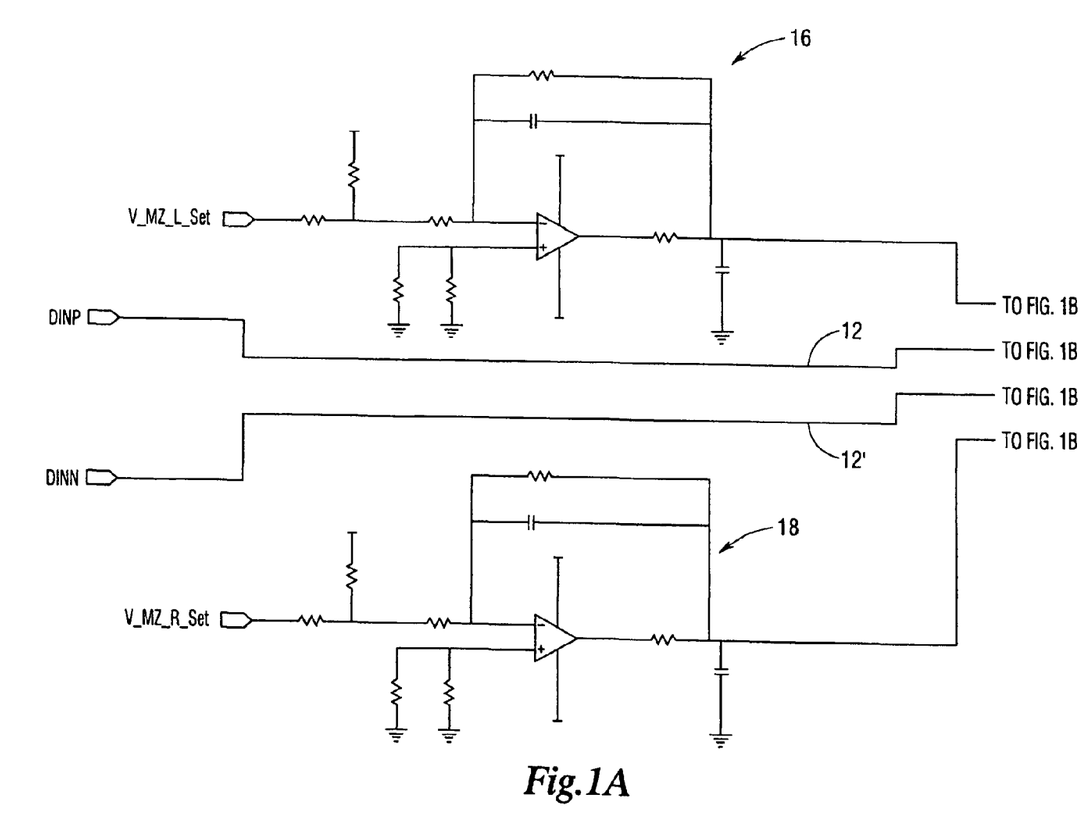
FIGS. 1A and 1B are a diagram illustrating a commercially available, tunable transmitter.
Figure 1B:
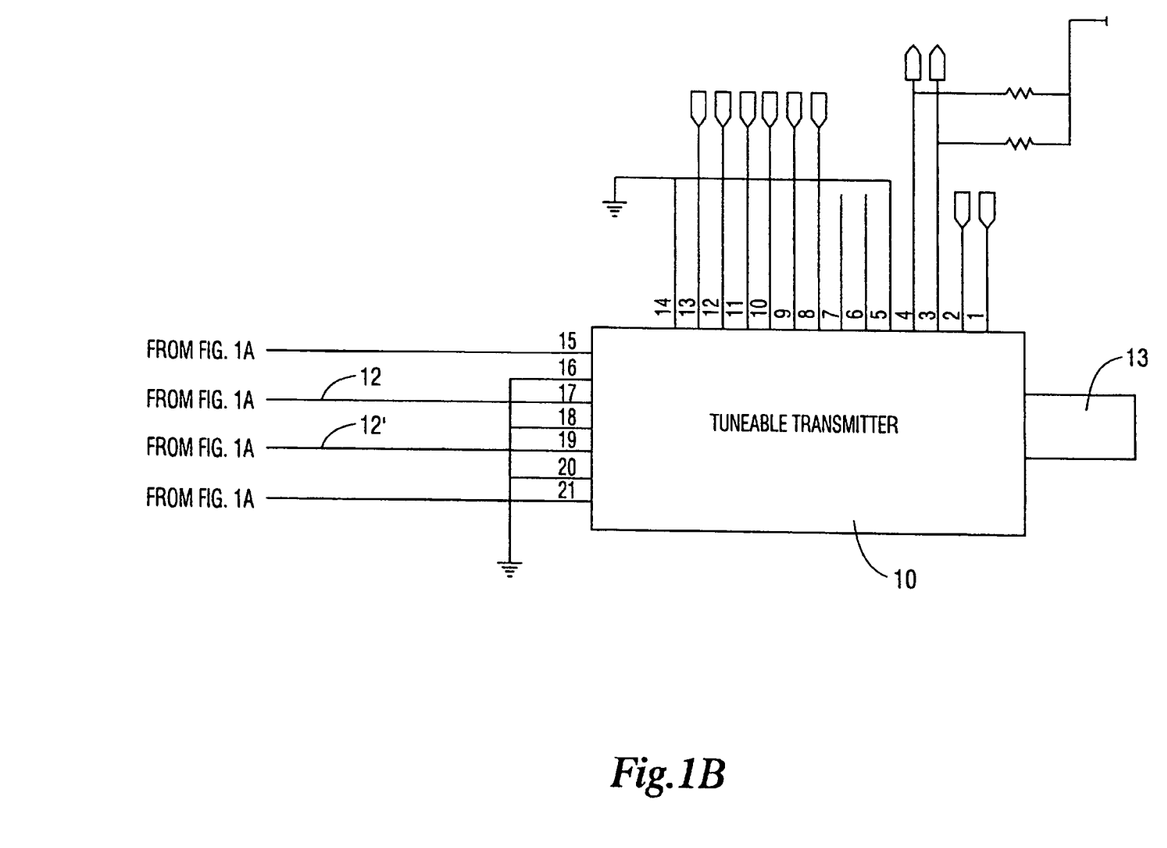

Shown in FIG. 1B is a tunable transmitter 10 which may be, for example, a dual drive, Mach-Zehnder, tunable transmitter (Lithium Niobate or Indium Phosphide). Tunable transmitter 10 has an internal laser (not shown) which produces a signal that is modulated by signals available on the two arms 12, 12' seen in FIGS. 1A and 1B. The modulated laser signal is then transmitted over an optical fiber 13. The tunable transmitter 10 may be designed for zero chirp. However, the transmitter 10 may nevertheless be caused to chirp by driving the amplitude of the signals available on the two arms 12, 12' asymmetrically. For reference, at 10 Gb/s, the optimal chirp is an alpha parameter value of −0.7. With that alpha parameter value, error-free transmission through 1600 ps/nm of dispersion (~100 km of fiber) is possible at 10 Gb/s. With zero chirp, transmission is possible through only 50 km of SMF-28.

Shown in FIG. 1A are circuits 16, 18 for setting the bias set points as is known in the art in response to control signals V_MZ_L_SET and V_MZ_R_SET, respectively. The signals DINP and DINN on arms 12, 12' are produced by the driver circuits 20, 20', respectively, shown in FIGS. 2A-2D.

Figure 2A:
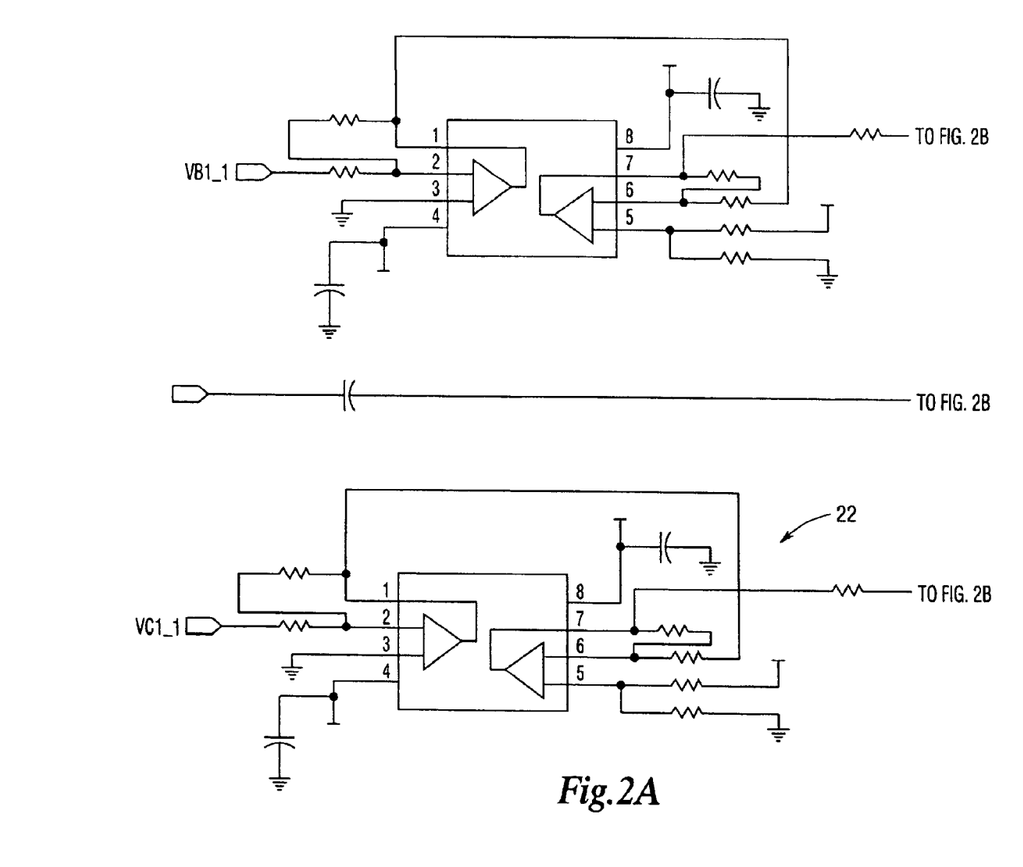
FIGS. 2A-2D illustrate two driver circuits for producing true and complement data signals.
Figure 2B:
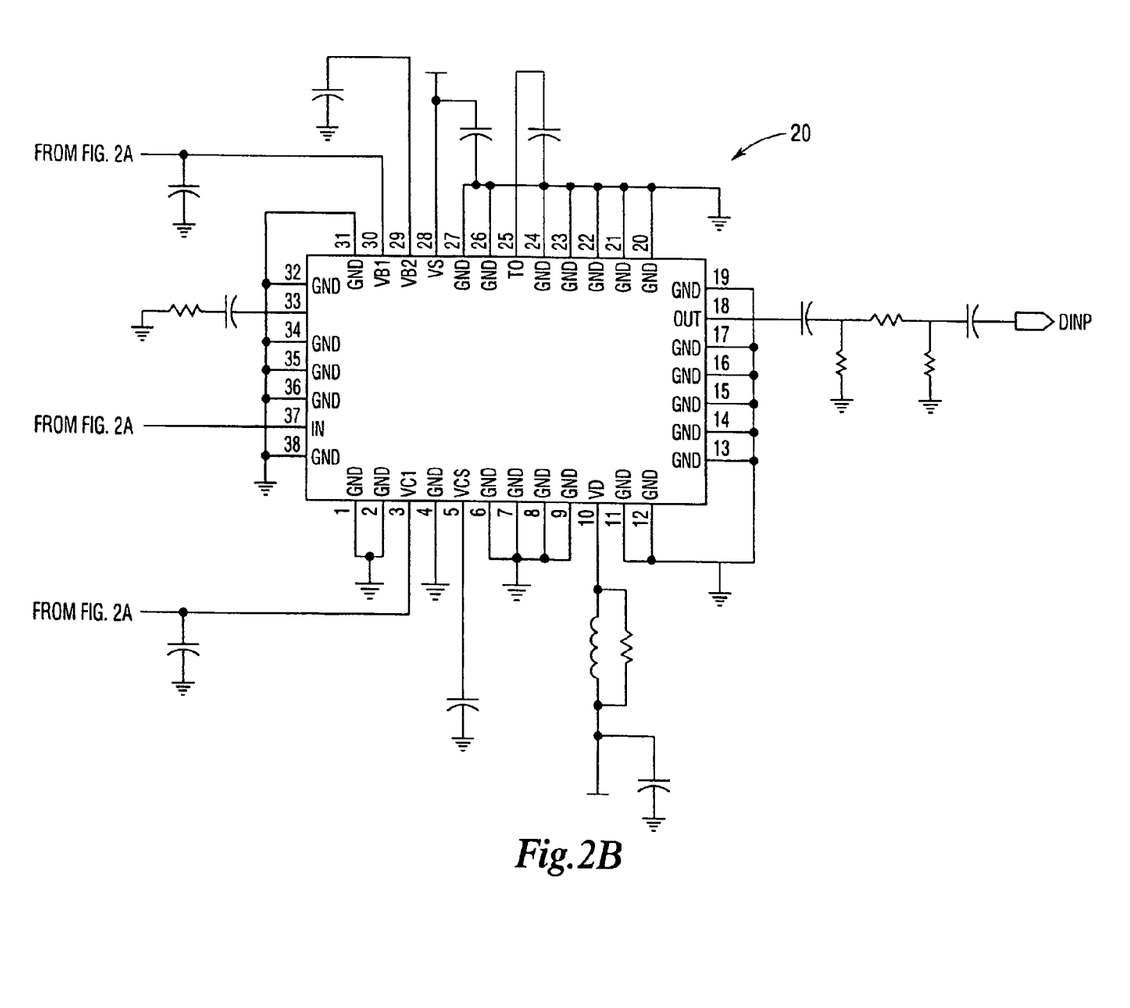
Figure 2C:
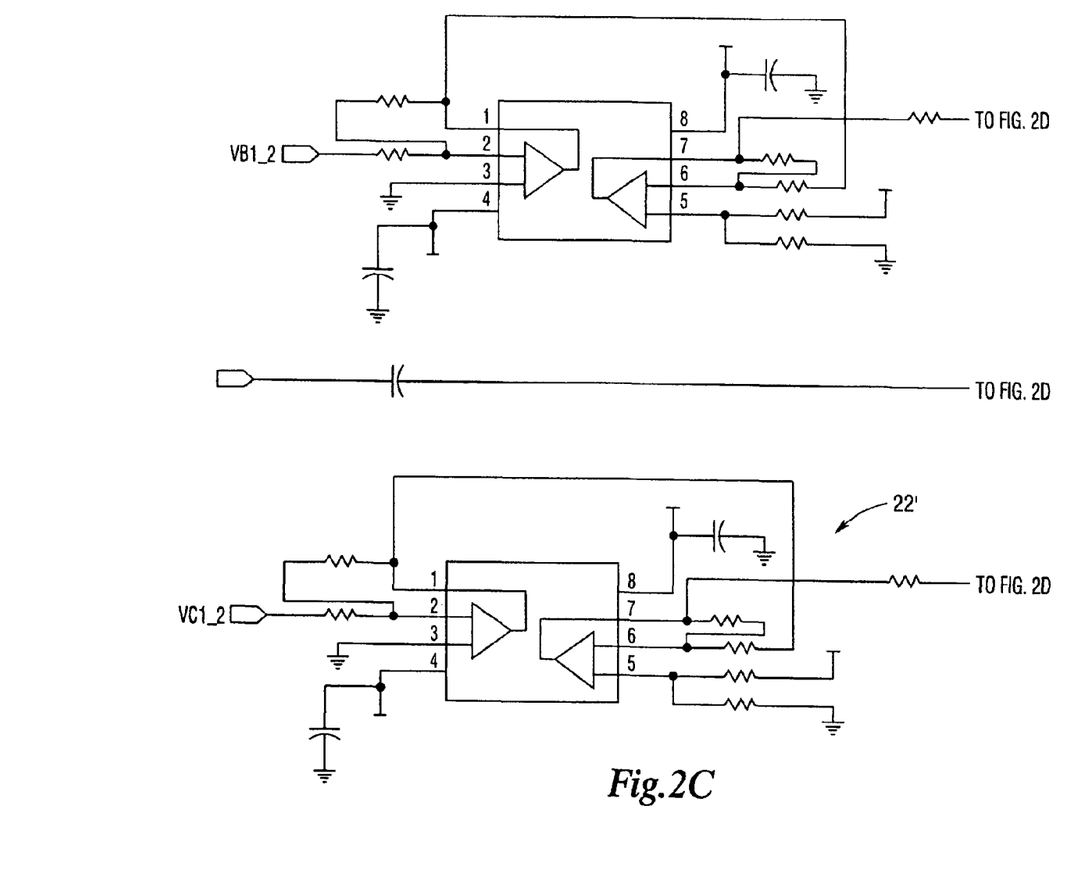
Figure 2D:
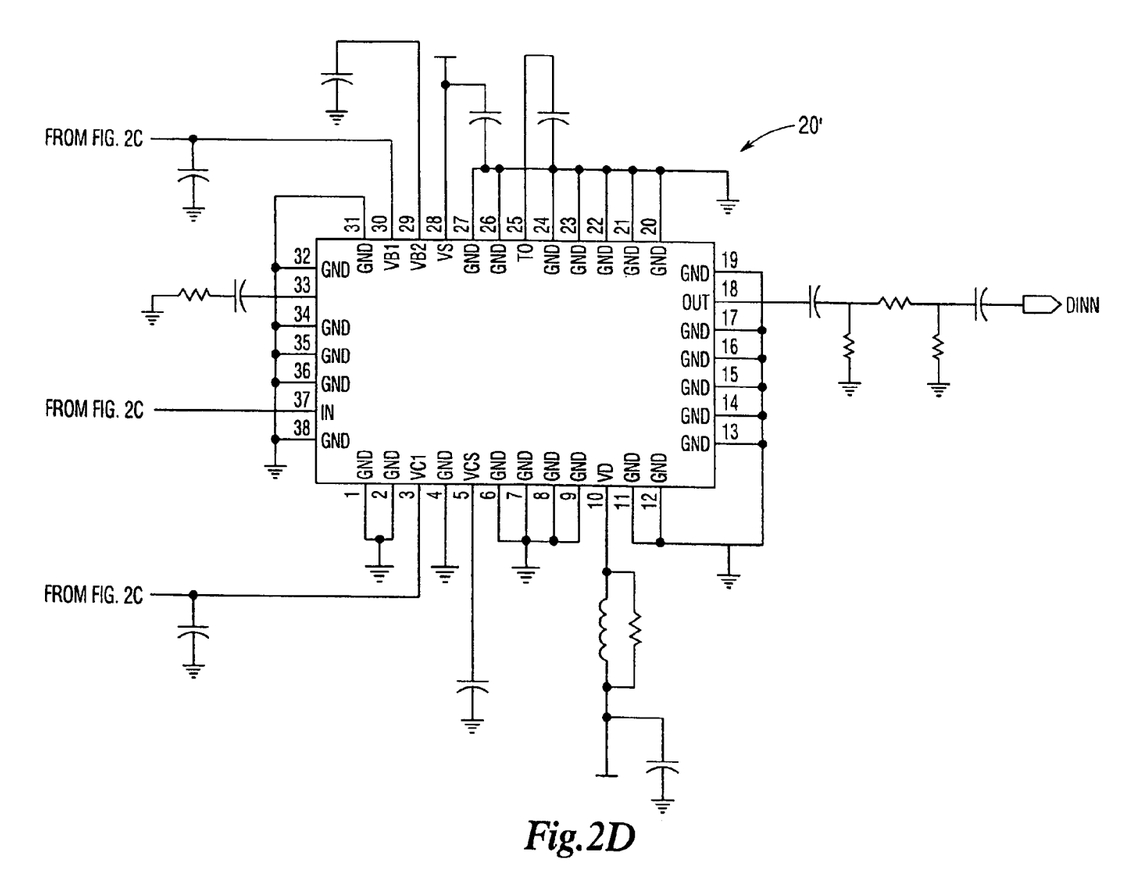
Figure 3:
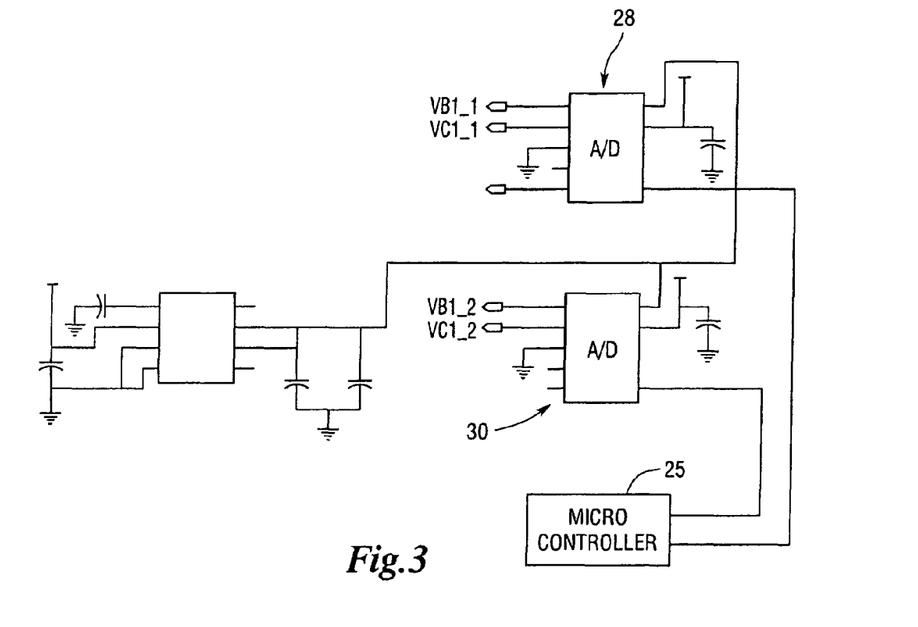
FIG. 3 illustrates a first micro-controller and two digital-to-analog circuits for producing the signals VC1_1, VC1_2.

Turning to FIGS. 2A and 2C, each of the driver circuits 20, 20' has an amplifier circuit 22, 22', respectively, that determines the gain of its respective driver circuit. The gain of each of the amplifier circuits 22, 22' is responsive to a control signal VC1_1 and VC1_2, respectively. One example of how the control signals VC1_1 and VC1_2 may be produced is illustrated in FIGS. 3A and 3B.

There are two extreme cases for operating the driver circuits 20, 20'. The first case is where the driver circuits produce output signals of equal amplitude, i.e., symmetric drive. In the symmetrical drive case, the alpha parameter is 0 (0 chirp) and the transmission link will be dispersion limited to about 800 ps/nm (50 km). For reference, SMF-28 is specified to be about 17 ps/nm-km. The other extreme case is for one of the driver circuits to be driven completely and the other to be terminated (i.e., no input drive signal from that driver). For this asymmetrical condition, the alpha parameter is equal to −1. Or, in other words, we have slightly too much negative chirp to compensate for the dispersion (positive chirp) in the fiber. As such, transmission will again be limited to less than the optimal value. By carefully adjusting the asymmetry of the drive between the two driver circuits 20, 20', an optimal value of alpha=−0.7 may be achieved.

It is known that the chirp is somewhat a function of the input wavelength for InP-based transmitters. This is not the case for Lithium Niobate modulators which are essentially wavelength independent. Thus, when using an InP-based modulator, the optimal drive voltage applied to each arm 12, 12' as well as the DC bias voltages applied via circuits 16, 18 are a function of wavelength as well. In other words, the electro-optic transfer function for an InP-based modulator is not uniform across the spectrum of interest. To achieve a constant extinction ratio versus wavelength, the input drive voltage on each arm 12, 12' and the DC bias voltages must be adjusted to take into account the frequency variation. That is normally accomplished through measurements taken at the frequencies of interest to determine the amount of amplitude adjustment needed to compensate for the frequency dependency. Sample measurements are shown below optimized for maximum span at 10 Gb/sec for an NRZ signal.

| Optical Frequency | 196.250 THz | 191.250 THz |
|---|---|---|
| V_left arm | −3.5 V | −4.2 V |
| V_right arm | −2.2 V | −3.3 V |
| Vpp_left arm | 0.5 V | 1.0 V |
| VPP_right arm | 4.0 V | 6.0 V |

From the measurements, the values for VC1_1, VC1_2, V_MZ_L_SET and V_MZ_R_SET at each frequency can be determined and stored in a table for future use.

To vary the chirp of the transmitter 10 by asymmetrically driving the input signals DINP and DINN, we have provided a circuit having two drivers 20, 20', where the gain of each is controlled independently by signals VC1_1 and VC1_2. We may control each driver circuit 20, 20' actively under microprocessor control or we may set a fixed offset between the two drivers by applying the appropriate attenuators on the output of one of the drivers. The disclosed method of asymmetrically driving the input signals DINP and DINN is not limited by the manner in which the gain of the two drivers 20, 20' is controlled. Also, note, that both positive and negative chirp may be achieved depending on which phase of the transmitter's transfer curve one chooses to bias.

Turning now to FIG. 3, that figure illustrates one embodiment for the production of the control signals VC1_1 and VC1_2. The disclosed method of generating the control signals VC1_1 and VC1_2 is not intended to limit the present disclosure. Other methods of generating the control signals VC1_1 and VC1_2 will be apparent to those of ordinary skill in the art. In FIG. 3, a first micro-controller 25 outputs digital signals to digital-to-analog (D/A) converters 28 and 30 which produce the signals VC1_1 and VC1_2, respectively. The signals output to the D/A converters 28 and 30 can be based on a table of values as discussed above.

Figure 4:
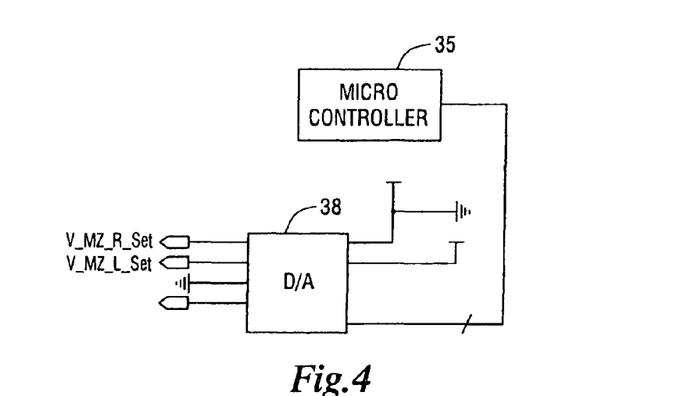
FIG. 4 illustrates a second micro-controller and a digital-to-analog circuit for producing the signals V_MZ_L_SET and V_MZ_R_SET.

FIG. 4 illustrate a second micro-controller 35 which outputs digital signals to a D/A converter 38 which produces the signals V_MZ_R_SET and V_MZ_L_SET. The signals output to the D/A converter 38 can be based on a table of values as discussed above.

It should be noted that although the present disclosure is directed to the introduction of chirp into a tunable transmitter which normally has no chirp, the disclosed method and apparatus may also be used to compensate for chirp in a tunable transmitter. For example, the signals on the input arms could be driven in such a manner so as to eliminate the chirp inherent in a tunable transmitter.

What is claimed is:

1. A fiber-optic transmission system, comprising:
   a transmitter having a designed chirp value, said transmitter having first and second inputs for receiving first and second input signals, respectively, used to produce a modulated output signal;
   an optical fiber responsive to said transmitter for receiving said output signal;
   a circuit for actively asymmetrically driving said first and second input signals so as to change said designed chirp value of said transmitter, wherein said circuit comprises first and second drivers, and wherein a gain of each of said first and second drivers is independently controlled; and
   a look-up table for controlling said gain of said first driver and said gain of said second driver wherein said look-up table includes a plurality of values each representing a drive voltage of either said first driver or said second driver, each of said drive voltages associated with a frequency variation of said modulated output signal.

2. The system of claim 1 additionally comprising a micro-controller for controlling said gain of said first driver and said gain of said second driver.

3. The system of claim 1 wherein one of said drivers includes an attenuator at an output thereof.

4. A combination, comprising:
   a transmitter having a designed chirp value, said transmitter having first and second inputs for receiving first and second input signals, respectively, used to produce a modulated output signal; and
   a circuit for actively controlling a first amplitude of said first input signal and a second amplitude of said second input signal such that said first and second amplitudes are asymmetrical so as to change said designed chirp value of said transmitter to another value, wherein said circuit comprises first and second drivers, and wherein a gain of each of said first and second drivers is independently controlled; and
   a look-up table for controlling said gain of said first driver and said gain of said second driver wherein said look-up table includes a plurality of values each representing a drive voltage of either said first driver or said second driver, each of said drive voltages associated with a frequency variation of said modulated output signal.

5. The combination of claim 4 additionally comprising a micro-controller for controlling said gain of said first driver and said gain of said second driver.

6. The combination of claim 4 wherein one of said drivers includes an attenuator at an output thereof.

7. A method of controlling a chirp of a transmitter having a modulated output signal, comprising:
   actively asymmetrically driving first and second input signals input to said transmitter so as to control change the chirp of said transmitter from a designed value to a desired value, wherein said asymmetrically driving comprises operating first and second drivers for said first and second input signals, respectively, with different gains;
   generating control signals for independently controlling the gains of said first and second drivers using a look-up-table, wherein said look-up table includes a plurality of values each representing a drive voltage of either said first driver or said second driver, each of said drive voltages associated with a frequency variation of said modulated output signal.

8. The method of claim 7 wherein said asymmetrically driving comprises attenuating one of said first or second input signals.

9. The method of claim 7 wherein said asymmetrically driving comprises driving said first and second input signals to change the chirp of said transmitter from a designed value of zero to a desired positive or negative value.

10. The method of claim 7 wherein said asymmetrically driving comprises driving said first and second input signals to change the chirp of said transmitter from a designed negative value to a desired positive value or zero.

11. The method of claim 7 wherein said asymmetrically driving comprises driving said first and second input signals to change the chirp of said transmitter from a designed positive value to a desired negative value or zero.

12. A method of controlling the chirp of a transmitter having a modulated output signal, comprising:
   actively controlling a first amplitude of a first input signal and a second amplitude of a second input signal such that said first and second amplitudes are asymmetrical so as to change said designed chirp value of said transmitter to another value, wherein said controlling comprises operating first and second drivers for said first and second input signals, respectively, with different gains;
   generating control signals for independently controlling the gains of said first and second drivers using a look-up-table, wherein said look-up table includes a plurality of values each representing a drive voltage of either said first driver or said second driver, each of said drive voltages associated with a frequency variation of said modulated output signal.

13. The method of claim 12 wherein said controlling comprises attenuating one of said first or said second input signals.

14. The method of claim 12 wherein said controlling comprises controlling said first and second input signals to change the chirp of said transmitter from a designed value of zero to a desired positive or negative value.

15. The method of claim 12 wherein said controlling comprises controlling said first and second input signals to change the chirp of said transmitter from a designed negative value to a desired positive value or zero.

16. The method of claim 12 wherein said controlling comprises controlling said first and second input signals to change the chirp of said transmitter from a designed positive value to a desired negative value or zero.

* * * * *